United States Patent
Omar et al.

(10) Patent No.: US 12,467,353 B2
(45) Date of Patent: Nov. 11, 2025

(54) LOOK-AROUND/LOOK-AHEAD PIXEL-BASED INVERSION WORKFLOW FOR REAL TIME PREDICTION AHEAD OF THE BIT IN HORIZONTAL AND HIGH-ANGLE WELLS

(71) Applicant: SCHLUMBERGER TECHNOLOGY CORPORATION, Sugar Land, TX (US)

(72) Inventors: Saad Omar, Cambridge, MA (US); Jingxuan Liu, Cambridge, MA (US); Lin Liang, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/114,477

(22) PCT Filed: Oct. 27, 2023

(86) PCT No.: PCT/US2023/036101
§ 371 (c)(1),
(2) Date: Mar. 24, 2025

(87) PCT Pub. No.: WO2024/091651
PCT Pub. Date: May 2, 2024

(65) Prior Publication Data
US 2025/0264018 A1    Aug. 21, 2025

Related U.S. Application Data

(60) Provisional application No. 63/381,220, filed on Oct. 27, 2022.

(51) Int. Cl.
G06F 11/30    (2006.01)
E21B 47/013   (2012.01)
G01V 3/26     (2006.01)

(52) U.S. Cl.
CPC .............. *E21B 47/013* (2020.05); *G01V 3/26* (2013.01)

(58) Field of Classification Search
CPC ................................. E21B 47/013; G01V 3/26
See application file for complete search history.

(56) References Cited

U.S. PATENT DOCUMENTS

| 2011/0238312 A1* | 9/2011 | Seydoux | G01V 3/30 |
| | | | 324/333 |
| 2014/0249754 A1* | 9/2014 | Donderici | G01V 3/26 |
| | | | 702/7 |

(Continued)

OTHER PUBLICATIONS

International Search Report and Written Opinion of International Patent Application No. PCT/US2023/036101 dated on Feb. 22, 2024, 11 pages.

(Continued)

*Primary Examiner* — Phuong Huynh
(74) *Attorney, Agent, or Firm* — Jeffrey D. Frantz (57) ABSTRACT

Embodiments presented provide for a method for providing look-ahead measurements ahead of a drill bit in hydrocarbon recovery operations. Embodiments use a pixel-based inversion workflow to produce real time prediction in horizontal and high-angle wells. The method includes obtaining data related to geological properties, performing a one dimensional look around inversion of the data to achieve one dimensional results, performing a two dimensional look ahead pixel based inversion wherein the generated results for the one dimensional look around inversion are used as a starting model to obtain a second set of results, and displaying the second set of results.

14 Claims, 4 Drawing Sheets

(56) References Cited

U.S. PATENT DOCUMENTS

2019/0128116 A1* 5/2019 Thiel .................... G01V 3/26
2022/0120930 A1 4/2022 Kiselev et al.

OTHER PUBLICATIONS

Yan L. et al., "2D Pixel Based Inversion Of Ultra-Deep Electromagnetic Logging Data For Look-Ahead Applications", Photonics & Electromagnetics Research Symposium (PIERS), 2022, pp. 43-48, IEEE Xplore.

* cited by examiner

LOOK-AROUND/LOOK-AHEAD PIXEL-BASED INVERSION WORKFLOW FOR REAL TIME PREDICTION AHEAD OF THE BIT IN HORIZONTAL AND HIGH-ANGLE WELLS

CROSS-REFERENCE TO RELATED APPLICATIONS

The present patent application is a national stage entry of International Application No. PCT/US2023/036101 that was filed on Oct. 27, 2023, which claims priority to U.S. Provisional Patent Application No. 63/381,220 that was filed on Oct. 27, 2022, which is herein incorporated by reference in its entirety.

FIELD OF THE DISCLOSURE

Aspects of the disclosure relate to logging while drilling activities. More specifically, aspects of the disclosure relate to a pixel-based inversion method for real time prediction ahead of the bit while drilling in horizontal and/or high angle wells.

BACKGROUND

Conventional technologies are discussed in several patents on "look-ahead" measurements for logging while drilling ("LWD") systems. In one example, U.S. Pat. No. 6,819,110 proposes a combination of axial and transverse magnetic dipole induction couplings for two or three antenna arrays to maximize the contribution ahead of the bit based on spatial sensitivities. It also covers part of look-ahead and look-around interpretation.

In another example embodiment, U.S. Pat. No. 8,736,270 describes the general look-ahead logging system using a conventional technology, implemented in EMLA experimental prototype. The patent does not cover the processing and interpretation, although "Look-around inversion" is mentioned with no details.

In another example embodiment, U.S. Pat. No. 11,306,582 described a look-around and look-ahead inversion to image the formation ahead of the bit with options of both model-based or pixel-based approach. It uses the shallow CDR and deep measurements but is limited to vertical and low angle wells Electromagnetic Look Ahead (EMLA) which is used for geo-stopping in vertical and low deviation wells in separate steps. Different technologies exist to attempt to solve lookaround in combination with look-ahead assuming perfect look-around shallow resistivity measurements.

In another conventional technology, U.S. Pat. No. 6,433,518 describes look-around processing using LWD directional resistivity measurements but that workflow is not designed for application to look-ahead interpretation.

There is a need to provide an apparatus and methods that easier to operate than conventional apparatus and methods.

There is a further need to provide apparatus and methods that do not have the drawbacks discussed above and to allow for proper look around/look ahead capabilities.

There is a still further need to reduce economic costs associated with operations and apparatus for real time look around/look ahead operations at the bit.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method for prediction ahead of a drill bit in a well is disclosed. The method may comprise obtaining data related to geological properties and performing a one dimensional look around inversion of the data to achieve one dimensional results. The method may further comprise performing a pixel based two dimensional look around inversion of the data, wherein the inversion uses one or more T-R spacings, wherein the one dimensional results are used as a starting model for the two dimensional look around inversion of the data, and wherein at least horizontal and vertical resistivity are inverted. Further, the method may comprise displaying the results of the pixel based two dimensional look around inversion. Additionally, the method may comprise performing a two dimensional look ahead pixel based inversion wherein the generated results for the two dimensional look around inversion are used as a starting model, wherein two dimensional pixel grids are constructed on one or more T-R spacings of the obtained data to obtain a second set of results, and displaying the second set of results.

In another example embodiment, a method for prediction ahead of a drill bit in a well is disclosed. The method may comprise obtaining data related to geological properties and performing a one dimensional look around inversion of the data to achieve one dimensional results, wherein the inversion includes inverting for boundary positions, formation dip, horizontal resistivity of all layers near the bit and vertical resistivity of all layers near the bit to generate results. Further, the method may comprise performing a two dimensional look ahead pixel based inversion wherein the generated results for the one dimensional look around inversion are used as a starting model, wherein two dimensional pixel grids are constructed on one or more T-R spacings of the obtained data to obtain a second set of results and displaying the second set of results.

In another example embodiment, a computer readable storage medium is disclosed having data stored therein representing executable by a computer, the software including instructions performing steps of obtaining data related to geological properties, performing a one dimensional look around inversion of the data to achieve one dimensional results, performing a pixel based two dimensional look around inversion of the data, wherein the inversion uses one or more T-R spacings and wherein the one dimensional results are used as a starting model for the two dimensional look around inversion, wherein horizontal and vertical resistivity of all look-behind and look around pixels are inverted, and displaying the results of the pixel based two dimensional look around inversion. Further, the software may include the instructions performing steps of performing a two dimensional look ahead pixel based inversion wherein the generated results for the two dimensional look around inversion are used as a starting model for the two dimensional look ahead pixel based inversion, wherein two dimensional pixel grids are constructed on one or more T-R spacings of the obtained data to obtain a second set of results, and displaying the second set of results.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Aspects of the disclosure demonstrates an unbiased pixel-based inversion workflow to predict via imaging the changes in formation profile ahead of the drilling bit in real-time. In one aspect, the proposed method is developed for the Schlumberger Geosphere tool in combination with conventional (co-axial, non-directional) ARC shallow look-around measurement, however, it is equally applicable to the general tri-axial deep directional resistivity tools with both shallow and deep triaxial measurements included in the tool. The workflow also includes anisotropy processing.

The workflow is also applicable to future deep directional EM measurements as well. Furthermore, the shallow resistivity data do not have to be induction or array propagation measurements, but also measurements such as resistivity at the bit. In general, this workflow is not limited to electromagnetic measurements, it is applicable to any combination of shallow and deep downhole measurement with look-ahead sensitivity.

The workflow can be applied using model-based parametric or pixel-based inversions. The model-based inversion parameterizes the model and solves for formation resistivities, thickness and dip, similarly to U.S. Pat. No. 6,594,584 as used for steering in horizontal wells. The pixel-based inversion is minimally biased and solves only for resistivity distribution and formation dip for given formation discretization.

A primary application of look-around/look-ahead inversion for deep directional electromagnetic (EM) logging-while-drilling technology is to optimize landings, geo-steer to maximize production, maximize reservoir exposure, and increase production potential. The tool has a modular design with transmitter and receiver subs, which enables multiple T-R spacings.

Figure 1:
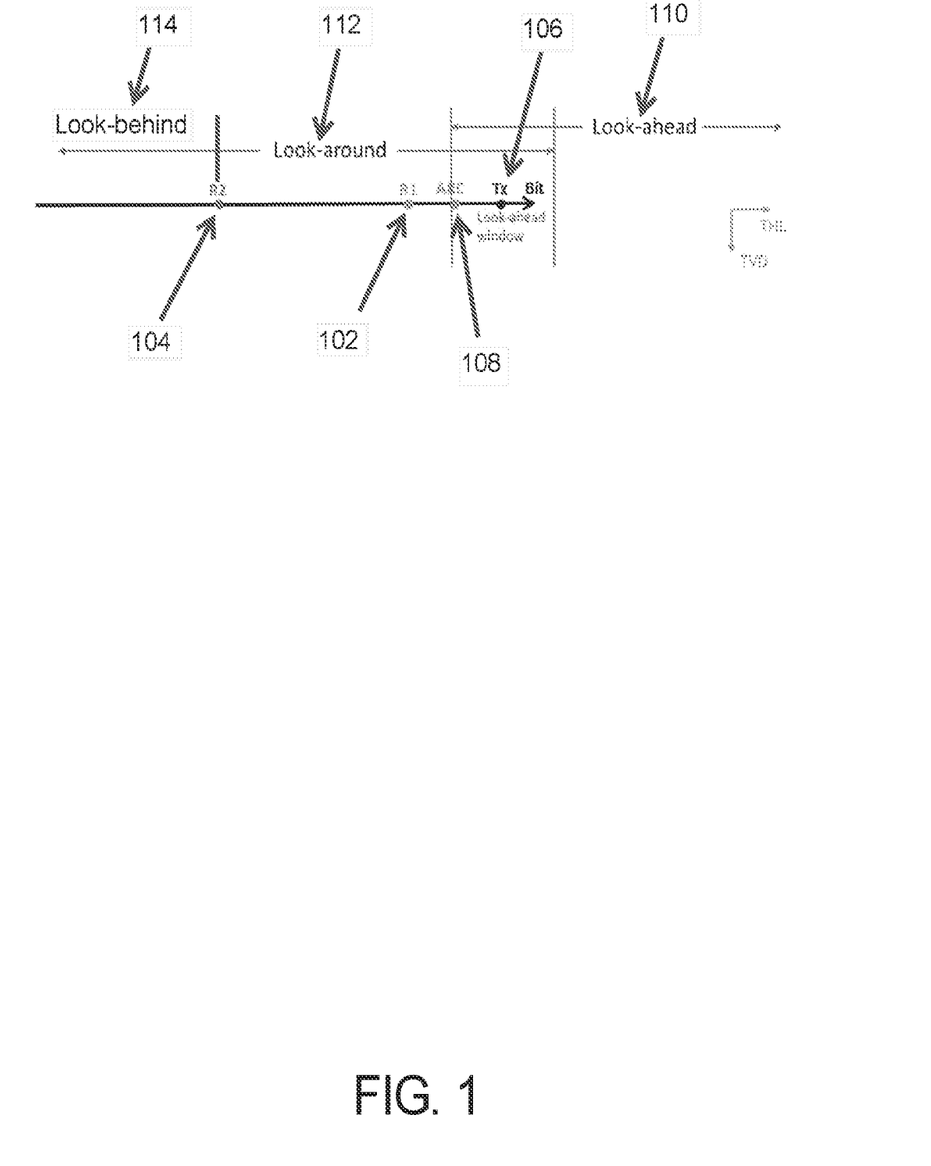
FIG. 1 is a schematic tool setup and definitions of the look-around, look-ahead and look-behind formation sections.

In the numerical experiment illustrating the workflow, we consider the following deep directional resistivity tool layout, as depicted in FIG. 1: a tilted antenna transmitter ("Tx") at position 106, which in one or more embodiments may be as close to the bit as possible, and two sets of triaxial receivers ("R1" and "R2") at positions 102 and 104, respectively, behind the Tx. In one or more embodiments, the Tx may be around 6 feet from the bit; however in other embodiments, the Tx may be anywhere from 3 feet to 10 feet from the bit. Further, in one or more embodiments, R1 and R2 may be around 30 feet and 60-80 feet behind the Tx, respectively; however, in other embodiments, the R1 may be anywhere from 10 feet to 50 feet behind the Tx, and the R2 may be anywhere from 40 feet to 100 feet behind the Tx. The workflow is valid for arbitrary spacings and number of receivers. A shallow resistivity propagation tool ("ARC") is assumed to be at the position 108 behind the Tx. In one or more embodiments, the ARC may be around 15 feet behind the Tx; however, in other embodiments, the ARC may be anywhere from 5 feet to 25 feet behind the Tx. The algorithm is not dependent on choice of frequencies and distribution of sensors, however, the depth of investigation depends on frequencies and sensor spacings.

Independent of the number of receivers used, the formation within the sensitivity range of the tool can be divided in three sections (see FIG. 1):

The look-ahead formation 110: interval ahead of the shallow resistivity tool (e.g., the interval ahead of ARC as depicted in FIG. 1).

The look-around formation 112: between the shallow resistivity tool (ARC) and the farthest Rx (e.g., the interval between ARC and R2 as depicted in FIG. 1). The look-around formation 112 takes the lookahead inversion window length into account.

The look-behind formation 114: interval behind the farthest Rx (e.g., the interval behind R2 as depicted in FIG. 1).

A successful interpretation of the formation ahead requires an accurate description of the look-around and look-behind formation. Consequently, the workflow is divided into two parts: first the look-around workflow to determine the look-around and look-behind formation resistivity, and secondly the lookahead inversion that utilizes that profile to determine the formation resistivity profile ahead.

The Multistep Look-Around/Look-Ahead Inversion Workflow

The look-around/look-ahead inversion workflow has two components: a look-around component 220, and then a look-ahead component 230 that uses results of the look-around component 220 as a starting model. There are two options for the look-around component 220: 1D look-around only, or 1D look-around with an additional 2D look-around using the 1D look-around results as a starting model. The details of the inversion workflow are outlined in FIG. 2.

Look-Around Inversion

Figure 2:
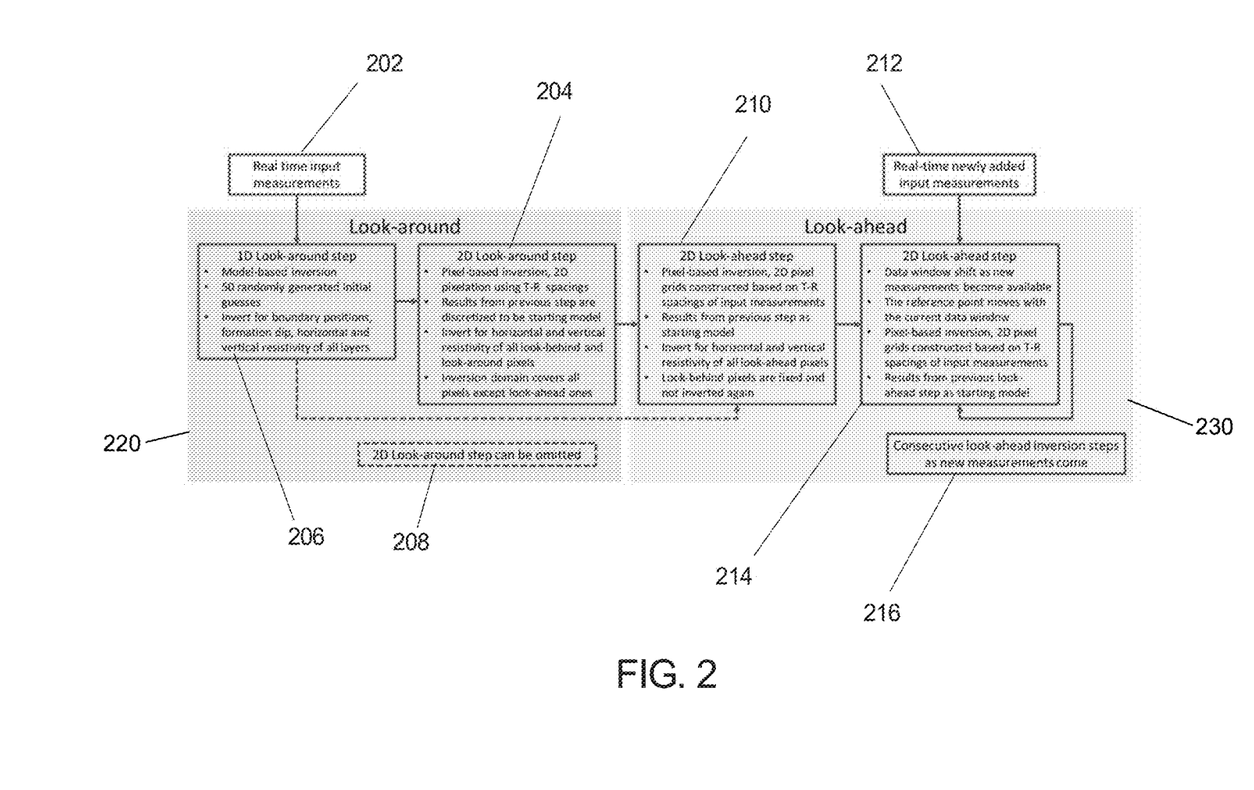
FIG. 2 is a graph of a flowchart of the look-around/look ahead inversion workflow.

Real time input measurements can be obtained at 202. The look-around step provides the pixel based initial guess for the next look-ahead inversion. This step can include either only 1D look-around inversion at 206 or 1D inversion at 206 followed by a 2D look-around inversion at 204.

1D Look-Around Inversion

The 1D look-around inversion is a model-based inversion. The parameters to be inverted include the logarithm of the horizontal and vertical resistivity, boundary positions, and formation dip. The 1D look-around inversion matches the real time input measurements obtained at 202 to a layered 1D formation using an efficient 1D EM solver. This 1D look-around inversion can also be replaced by an 1D pixel-based inversion, where the parameters to be inverted include horizontal and vertical resistivity distribution and formation dip for given formation discretization.

Inversion Algorithm of the 1D Look-Around Inversion

The inversion of the 1D look-around inversion is based on a regularized Gauss-Newton optimization algorithm. A regularization on the resistivity-differences between the layers is used to reduce noise effects using an L-curve method. By starting with 50 randomly generated initial guesses, the Gauss-Newton minimization intends to find the global optimal solution. The results with best match reconstructed measurements are discretized into a 2D pixel curtain section of the THL-TVD plane to be the initial guess (starting model) for following steps.

If the formation is relatively homogeneous along the well direction, 1D inversion results can provide a good starting model for the 2D look-ahead inversion at 210. This helps to save time by removing the time consuming 2D look-around inversion at 204. However, for realistic scenarios, 2D look-around inversion at 204 may be inevitable and leads to better look-ahead results. As detailed at 208, 2D look-around inversion at 204 may be eliminated and the method progresses to the 2D look-ahead inversion at 210.

2D Look-Around Inversion

The 2D look-around inversion at 204 is a pixel-based inversion. The inversion starts with a 2D curtain section discretized from the 1D look-around inversion results at 206. The anisotropic resistivity of each pixel is inverted using the Gauss-Newton minimization algorithm. The inversion uses a 2.5D finite-difference EM solver to simulate tool responses. This forward solver also computes response sensitivities with respect to the pixel resistivities using an adjoint variable method. An adaptive regularization helps to find the most plausible resistivity distribution with the least resistivity variation and measurement misfit.

Inversion Algorithm of the 2D Look-Around Inversion

To estimate the 2D resistivity distribution, we minimize the following cost function through the inversion:

$$C(x) = 1/2\|W_d \cdot (f(x) - m)\|^2 + 1/2\lambda \cdot \phi_G(R \cdot x) \quad (EQ. 1)$$

where Wd is a weighting matrix of reciprocal measurement noise standard deviations multiplied on the difference between the forward tool response f of the model vector x and the actual measured data m. The model vector x contains the horizontal and vertical resistivity of all pixels, put into a vector form, and tool response f of the model is generated with the aforementioned 2.5D EM solver. The error term is augmented with a regularization term on the model vector x, where R is a weighted bi-diagonal matrix that extracts the first differences of the pixel resistivity and resistivity anisotropies in both directions of the imaging plane. The inverse of the pixel heights and widths are multiplied into R and the regularization along THL is multiplied by a factor of three (in the look-around step) and 1.5 (in look-ahead steps) to enforce less variation along THL than TVD. By using the function $\phi_G(y) = \Sigma_i \phi_G(y_i)$ on the first differences, where $y_i$ are the elements of the input vector y and $\phi_G(y_i) = \sqrt{y_i^2 + c^2}$, a $l_1$-norm like regularization is achieved (using a constant $c \ll y_i$). This facilitates reconstruction of blocky models, allowing large changes and suppressing small variation in pixel resistivities.

Because the forward modeling is a nonlinear function, the cost function is minimized in an iterative manner by linearization around a starting model x0:

$$C(\Delta x) = 1/2\|W_d \cdot (f(x_0) + J \cdot \Delta x - m)\|^2 + 1/2\lambda \cdot \phi_G(R \cdot (x_0 + \Delta x)) \quad (EQ. 2)$$

where the Jacobian matrix J contains the first derivatives of the simulated responses with respect to x, computed using the adjoint variable technique. The model update $\Delta x$ is found by minimizing this linearized cost function (Eq. 2). Due to the non-squared regularization term, no closed-form solution exists and $\Delta x$ has to be found through the iterative reweighting algorithm. If $\Delta x$ does not reduce the cost function because the step is outside of the validity of the linearization, a line search algorithm is employed, iteratively reducing the Δx step length until the cost function can be reduced. Once the cost function has been reduced, the linearization process is repeated until convergence. The regularization constant λ balances the two terms of the cost function and ensures that the simplest model is found that can reconstruct the measurements. λ is estimated at each inversion iteration via Occam's method. Once the error term is linearized, the cost function update Δx is calculated for different values of λ. The Δx that reduces the actual error term the most determines the choice of:

$$\lambda_c = \min[\|W_d \cdot (f(x+\Delta x(\lambda)) - m)\|^2]$$ (EQ. 3).

The search for $\lambda_c$ can be efficiently implemented using a line-search and only requires a few extra forward model calls. However, the number of iterations is reduced compared to using a heuristically found regularization constant λ, which reduces the number of costly computations of the Jacobian matrix J.

Setup of Inversion Domain and Forward Model Call

The formation in the vicinity of the wellbore is discretized using a non-uniform 2D pixel distribution based on measurement sensitivities. The window of pixels for inversion are larger than two times of the longest tool T-R spacing. The discretization is required to be fine close to the tool, but coarse far from the tool, which is required by the measurement sensitivities and the consideration of calculation time. Usually, in the tool region, the pixel width along a True Horizontal Length direction is set to be uniform as the T-R spacing of the shallowest measurement, and for regions outside of tool, the pixel width increases linearly or exponentially. Along a True Vertical Depth direction, a uniform or quadratically increasing pixel height are set to fill the area up to two times away from the tool. In one or more embodiments, the computational grid in the 2.5D finite-difference forward solver is different from the inversion grid.

Parallelization of Forward Modeling

The forward modeling may be parallelized to run on a high-performance computing (HPC) cluster, such that the response of each station of the data window at each frequency may be computed simultaneously. The parallelization may be beneficial for real time application. Real time measurements may be obtained at 212.

2D Look-Ahead Inversion

The 2D look-ahead inversion at 210 may use the same forward modeling solver and inversion algorithm as the 2D look-around inversion. The main difference between the look-around and look-ahead inversion is the range of window where pixels are to be inverted. In the 2D look-around inversion, all pixels in the curtain section behind the look-ahead region are inverted and updated every iteration, while for 2D look-ahead inversion, only the pixels in the region of look-ahead are updated. The position of the boundary to divide the look-ahead region may be set to be 20-50 feet behind the transmitter.

To avoid a local minimum, a second starting model of the 2D look-ahead inversion can be added with resistivity and anisotropies values adjusted to 1.2 times the original for all pixels within the range of lookahead inversion. The solution with the lower residual is passed to the next look-ahead inversion at 214.

The Real-Time Look-Around/Look-Ahead Workflow

As discussed above, the look-around step can be run in two ways: 1D look-around step at 206 only; or 1D look-around at 206, which is used as an initial guess for the 2D look-around at 204. For real-time prediction ahead of the bit in horizontal and high-angle wells, the look around step is necessary which will serve as a starting model for the consecutive 2D look-ahead inversion steps at 210 and 214. The workflow for real-time look-around/look-ahead is outlined in FIG. 2.

Data Window

At 214, the data window for 2D look-around/look-ahead are set to be at least 1.5 times of the T-R spacing of the deepest measurement. The data window for shallow measurements may be longer than the data window for deep measurements. The data window size for measurements except for the measurement with longest spacing are adjusted based on the difference between their spacing values with the longest one. The offsets of the data window length may also be set to match the real-time data processing. In the look-ahead step, only the data affecting the invertible section is chosen for processing. Tool responses are proportionally sampled based on its T-R spacing. This data selection ensures that all formation features which the tool measurements are sensitive to (in both forward and backward direction) are taken into account. In the real-time inversion, the data-window can be shifted at a constant measured depth as new measurements become available at 212. As will be understood, consecutive inversion steps may be accomplished as new data/measurements are obtained, at 216.

Inversion Validation

To visualize the Ultra Deep Azimuthal Resistivity ("UDAR") look-around/look-ahead inversion results, we show the 2D curtain section result of each processing window. A first window shows results by the look-around step at 204, and a second window shows the results for each look-ahead step at 214, which is repeated every 5 ft. of drilling. A black solid line is used to represent the data window referring to the mid-point of the first T-R spacing. A bold dashed line corresponds to the tool transmitter position (106 as shown in FIG. 1).

Simple Fault Case

Figure 3:
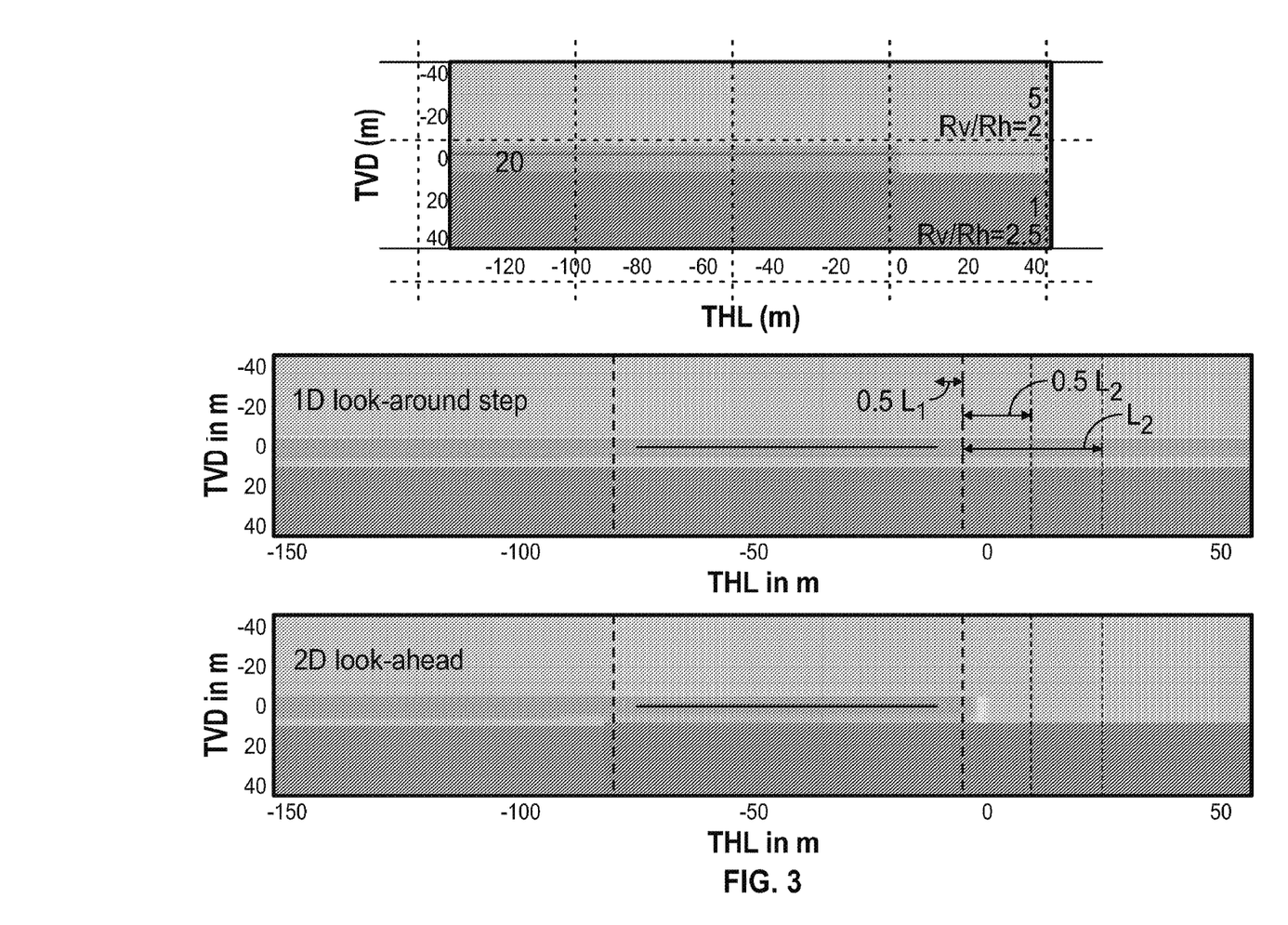
FIG. 3 is novel look-around/look ahead workflow result for simple fault cases.

The first example of a resistivity anomaly ahead of drill path is a three-layer formation with an abrupt resistivity discontinuity at 0 m, shown in the top sub-figure in FIG. 3. The responses of a UDAR tool with two receivers spaced 10 and 30 meters from the transmitter are generated, using 2.5D forward modeling, for a horizontal well 15 feet below the top of the thin layered (45 feet) oil-bearing sand region. The workflow includes 1D look-around inversion and then 2D look-ahead inversion. The reservoir maps generated using 1D look-around and 2D look-ahead inversion are shown in the 2nd and 3rd subplot of FIG. 3. Only one look-ahead inversion step is shown. As evident, the discontinuity can be predicted approximately 30 feet ahead of the transmitter (as shown by the dotted line).

Two Sand Body Case (Discontinuity in Overlapping Sand Channel)

Figure 4:
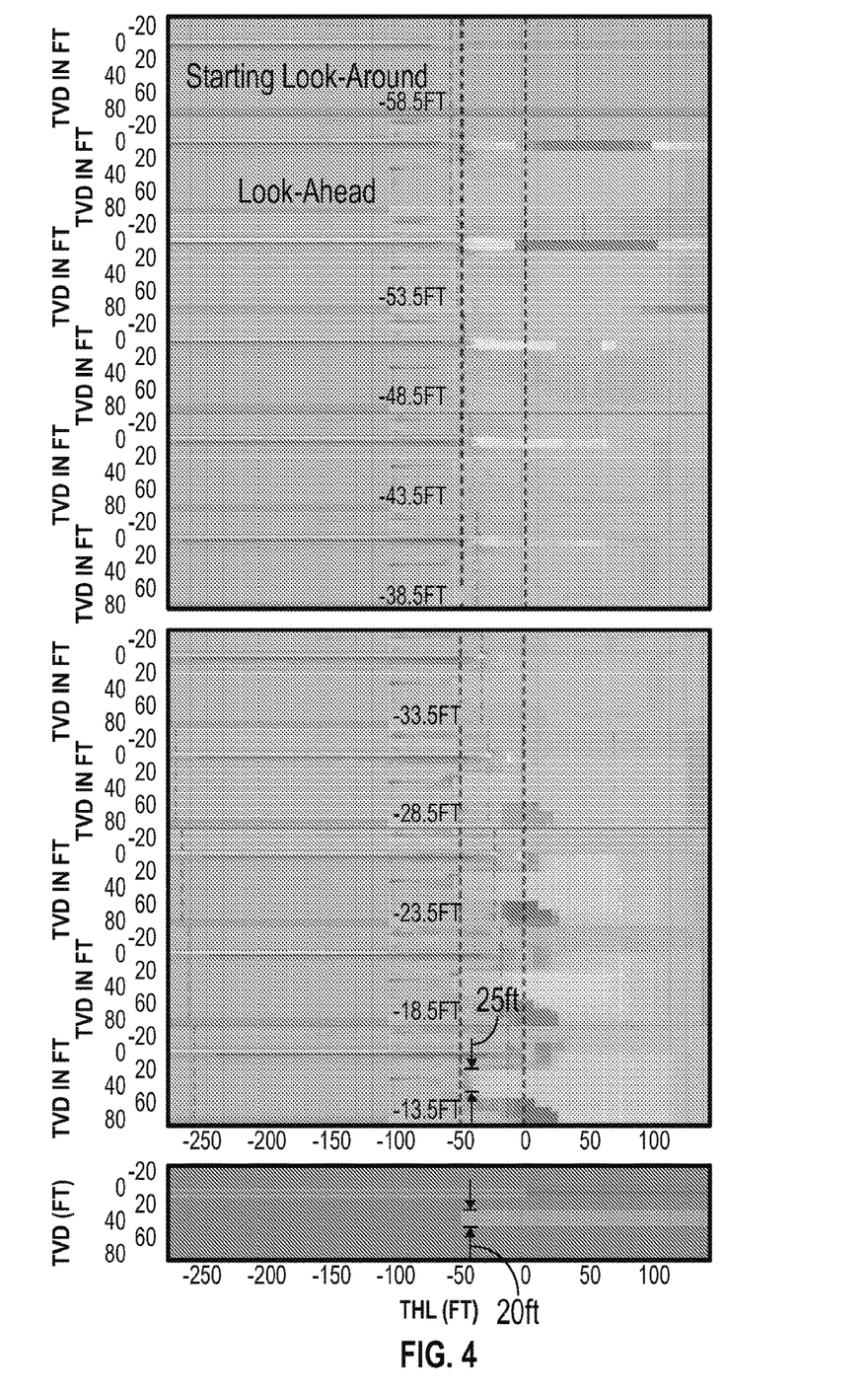
FIG. 4 is a novel look-around/look ahead workflow result for sand channel case.

The second example, as shown in FIG. 4, shows a simplified case requiring ability to looking-ahead of the bit for geo-steering away from discontinuity into a horizontally overlapping but vertically discontinuous pay-zone two staggered sand body with the same horizontal and vertical resistivity of 50 Ωm in a shaly environment of 2 Ωm horizontal and 8 Ωm vertical resistivity. The drilling trajectory passes through the upper sand body (layer thickness of 10 feet) with 5 feet below the upper boundary and hits the discontinuity at 0 meters. A second 20 foot thick sand body below it has an overlap of 50 feet with 15 feet inter-boundary separation from the upper sand channel.

The first step Look-Around is run at −58.5 feet (Tx location), where 1D Look-Around results are used as initial guess for 2D Look-Around inversion. The first pass 2D Look-Around results are shown in the second row of FIG. 4. Look-Ahead results are shown in the third row onward for every 5 feet stepping of the input data window. As evident, the discontinuity can be again predicted approximately 30 feet ahead of the transmitter (as shown by the dotted line) and lower sand body can be detected as soon as the transmitter is vertically above it.

In one example embodiment, a method for prediction ahead of a drill bit in a well is disclosed. The method may comprise obtaining data related to geological properties and performing a one dimensional look around inversion of the data to achieve one dimensional results. The method may further comprise performing a pixel based two dimensional look around inversion of the data, wherein the inversion uses one or more T-R spacings, wherein the one dimensional results are used as a starting model for the two dimensional look around inversion of the data, and wherein at least horizontal and vertical resistivity are inverted. Further, the method may comprise displaying the results of the pixel based two dimensional look around inversion. Additionally, the method may comprise performing a two dimensional look ahead pixel based inversion wherein the generated results for the two dimensional look around inversion are used as a starting model, wherein two dimensional pixel grids are constructed on one or more T-R spacings of the obtained data to obtain a second set of results, and displaying the second set of results.

In another example embodiment the wherein at least a portion of the well has a dip of at least 45 degrees. In another example embodiment the well is a high angle well, a horizontal well, or a combination thereof.

In another example embodiment, the method may be performed, wherein the one-dimensional look-around inversion of the data determines at least one boundary position.

In another example embodiment, the method may be performed, wherein the one-dimensional look-around inversion of the data determines at least one formation dip.

In another example embodiment, the method may be performed, wherein the one-dimensional look-around inversion of the data determines horizontal and vertical resistivity of all geological layers around the bit.

In another example embodiment, a method for prediction ahead of a drill bit in a well is disclosed. The method may comprise obtaining data related to geological properties and performing a one dimensional look around inversion of the data to achieve one dimensional results, wherein the inversion includes inverting for boundary positions, formation dip, horizontal resistivity of all layers near the bit and vertical resistivity of all layers near the bit to generate results. Further, the method may comprise performing a two dimensional look ahead pixel based inversion wherein the generated results for the one dimensional look around inversion are used as a starting model, wherein two dimensional pixel grids are constructed on one or more T-R spacings of the obtained data to obtain a second set of results and displaying the second set of results.

In another example embodiment, the method may be performed wherein after displaying the results at current depth location, obtaining newly added input measurements from next depth location and shifting a data window for analysis, performing a second two dimensional look ahead pixel based inversion of the newly added input measurements, generating an augmented second set of results and displaying the second set of augmented results.

In another example embodiment, a computer readable storage medium is disclosed having data stored therein representing executable by a computer, the software including instructions performing steps of obtaining data related to geological properties, performing a one dimensional look around inversion of the data to achieve one dimensional results, performing a pixel based two dimensional look around inversion of the data, wherein the inversion uses one or more T-R spacings and wherein the one dimensional results are used as a starting model for the two dimensional look around inversion, wherein horizontal and vertical resistivity of all look-behind and look around pixels are inverted, and displaying the results of the pixel based two dimensional look around inversion. Further, the software may include the instructions performing steps of performing a two dimensional look ahead pixel based inversion wherein the generated results for the two dimensional look around inversion are used as a starting model for the two dimensional look ahead pixel based inversion, wherein two dimensional pixel grids are constructed on one or more T-R spacings of the obtained data to obtain a second set of results, and displaying the second set of results.

In another example embodiment the wherein at least a portion of the well has a dip of at least 45 degrees. In another example embodiment the well is a high angle well, a horizontal well, or a combination thereof.

In another example embodiment the medium is configured wherein the one-dimensional look-around inversion of the data determines at least one boundary position.

In another example embodiment the medium is configured wherein the one-dimensional look-around inversion of the data determines at least one formation dip.

In another example embodiment the medium is configured wherein after displaying the second set of results at a current depth location, the software further includes instructions performing steps of obtaining newly added input measurements for a next depth location, shifting a data window for analysis, performing a second two dimensional look ahead pixel based inversion using the newly added input measurements, generating an augmented second set of results, and displaying the augmented second set of results.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method for prediction ahead of a drill bit in a well, comprising:
   disposing a drilling tool in a wellbore, the drilling tool comprising a transmitter, a receiver, a sensor, and the drill bit;
   performing a one dimensional look around inversion of data obtained via the sensor to achieve one dimensional results, wherein the data is related to geological properties;

performing a pixel based two dimensional look around inversion of the data, wherein the inversion uses one or more T-R spacings, at least one of the one or more T-R spacings based on a distance between the transmitter and the receiver, wherein the one dimensional results are used as a starting model for the two dimensional look around inversion of the data, and wherein at least horizontal and vertical resistivity are inverted;

displaying results of the pixel based two dimensional look around inversion;

performing a two dimensional look ahead pixel based inversion wherein the results for the two dimensional look around inversion are used as a starting model, wherein two dimensional pixel grids are constructed on the one or more T-R spacings to obtain a second set of results;

displaying the second set of results; and predicting a geological feature at least 30 feet ahead of the transmitter based on the second set of results.

2. The method of claim 1, wherein at least a portion of the well has a dip of at least 45 degrees.

3. The method of claim 2, wherein the well is a high angle well, a horizontal well, or a combination thereof.

4. The method according to claim 1, wherein performing the one dimensional look around inversion of the data determines at least one boundary position.

5. The method according to claim 1, wherein performing the one dimensional look around inversion of the data determines at least one formation dip.

6. The method according to claim 1, wherein performing the one dimensional look around inversion of the data determines horizontal and vertical resistivity of all geological layers around the drill bit.

7. A method for prediction ahead of a drill bit in a well, comprising:

disposing a drilling tool in a wellbore, the drilling tool comprising a transmitter, a receiver, and the drill bit;

obtaining data related to geological properties;

performing a one dimensional look around inversion of the data to achieve one dimensional results, wherein the inversion includes inverting for boundary positions, formation dip, horizontal resistivity of all layers near the drill bit, and vertical resistivity of all layers near the drill bit to generate results;

performing a two dimensional look ahead pixel based inversion wherein the results for the one dimensional look around inversion are used as a starting model, wherein two dimensional pixel grids are constructed on one or more T-R spacings of the obtained data to obtain a second set of results, at least one of the one or more T-R spacings based on a distance between the transmitter and the receiver;

displaying the second set of results; and predicting a geological feature at least 30 feet ahead of the transmitter based on the second set of results.

8. The method according to claim 7, wherein after displaying the second set of results at a current depth location, the method further comprises obtaining newly added input measurements for a next depth location;

shifting a data window for analysis;

performing a second two dimensional look ahead pixel based inversion using the newly added input measurements;

generating an augmented second set of results; and displaying the augmented second set of results.

9. A non-transitory computer readable storage medium having data stored therein representing software executable by a computer, the software including instructions performing steps of:

obtaining data related to geological properties by disposing a drilling tool in a wellbore, the drilling tool comprising a transmitter, a receiver, and a drill bit;

performing a one dimensional look around inversion of the data to achieve one dimensional results;

performing a pixel based two dimensional look around inversion of the data, wherein the inversion uses one or more T-R spacings, at least one of the one or more T-R spacings based on a distance between the transmitter and the receiver, and wherein the one dimensional results are used as a starting model for the two dimensional look around inversion, wherein horizontal and vertical resistivity of all look behind and look around pixels are inverted;

displaying results of the pixel based two dimensional look around inversion;

performing a two dimensional look ahead pixel based inversion wherein generated results for the two dimensional look around inversion are used as a starting model for the two dimensional look ahead pixel based inversion, wherein two dimensional pixel grids are constructed on one or more T-R spacings of the obtained data to obtain a second set of results;

displaying the second set of results; and predicting a geological feature at least 30 feet ahead of the transmitter based on the second set of results.

10. The non-transitory computer readable storage medium of claim 9, wherein at least a portion of the wellbore has a dip of at least 45 degrees.

11. The non-transitory computer readable storage medium of claim 10, wherein the wellbore is a high angle well, a horizontal well, or a combination thereof.

12. The non-transitory computer readable storage medium of claim 9, wherein the one dimensional look around inversion of the data determines at least one boundary position.

13. The non-transitory computer readable storage medium of claim 9, wherein the one dimensional look around inversion of the data determines at least one formation dip.

14. The non-transitory computer readable storage medium of claim 9, wherein after displaying the second set of results at a current depth location, the software further includes instructions performing steps of:

obtaining newly added input measurements for a next depth location;

shifting a data window for analysis;

performing a second two dimensional look ahead pixel based inversion using the newly added input measurements;

generating an augmented second set of results; and displaying the augmented second set of results.

* * * * *